United States Patent
Miyazaki et al.

[11] Patent Number: 5,558,945
[45] Date of Patent: Sep. 24, 1996

[54] MAGNETIC RECORDING MEDIUM

[75] Inventors: Shinji Miyazaki; Jiro Yoshinari; Koji Kobayashi, all of Nagano, Japan

[73] Assignee: TDK Corporation, Tokyo, Japan

[21] Appl. No.: 360,965

[22] Filed: Dec. 21, 1994

[30] Foreign Application Priority Data

Dec. 28, 1993 [JP] Japan .................... 5-334145

[51] Int. Cl.⁶ ...................................... G11B 5/66
[52] U.S. Cl. .................. 428/611; 428/212; 428/216; 428/639; 428/668; 428/694 TM; 428/900; 428/928
[58] Field of Search .................... 428/212, 216, 428/611, 639, 668, 694 TM, 900, 928

[56] References Cited

U.S. PATENT DOCUMENTS

| | | | |
|---|---|---|---|
| 4,770,924 | 9/1988 | Takai et al. | 428/212 |
| 4,797,330 | 1/1989 | Nasu et al. | 428/694 |
| 5,225,234 | 7/1993 | Takai et al. | 428/336 |
| 5,418,059 | 5/1995 | Sugita et al. | 428/332 |

FOREIGN PATENT DOCUMENTS

| | | |
|---|---|---|
| 54-145505 | 11/1979 | Japan . |
| 61-294635 | 12/1986 | Japan . |
| 1-124115 | 5/1989 | Japan . |
| 1-208720 | 8/1989 | Japan . |
| 2-68712 | 3/1990 | Japan . |
| 2-179917 | 7/1990 | Japan . |
| 4-26914 | 1/1992 | Japan . |

*Primary Examiner*—Stevan A. Resan
*Attorney, Agent, or Firm*—Stephen F. K. Yee

[57] ABSTRACT

A magnetic recording medium having excellent electromagnetic characteristics, still characteristics and cupping, decreased rust generation and high durability, includes a non-magnetic substrate and a magnetic layer formed thereon by oblique deposition, the magnetic layer being composed of at least two ferromagnetic thin films, in which the ferromagnetic thin film of the lowest layer has a saturation magnetization of 300 emu/cc or less, a coercive force of 1000 Oe or less and a thickness of 300 to 1500 Å, the ferromagnetic thin layer of the uppermost layer has a saturation magnetization of 300 emu/cc or more, a coercive force of 1000 Oe or more and a thickness of 400 to 1500 Å, an average value ($\theta$) of angles between growing directions of columnar crystalline particles constituting the ferromagnetic thin film of the lowest layer and a principal plane of the substrate ranges from 50 to 70 degrees, and an average value ($\theta$) of angles between growing directions of columnar crystalline particles constituting the ferromagnetic thin film of the uppermost layer and the principal plane of the substrate ranges from 30 to 50 degrees.

1 Claim, No Drawings

MAGNETIC RECORDING MEDIUM

BACKGROUND OF THE INVENTION

The present invention relates to a magnetic recording medium having a ferromagnetic thin layer serving as a magnetic layer, and more particularly to a magnetic recording medium satisfying requirements for still characteristics and durability as well as high electromagnetic characteristics.

With recent increases in recording density of magnetic recording media, the thickness of the recording media has been decreased. The still characteristics and the durability are deteriorated and the reproduced output in a low density region is lowered with decreasing film thickness. Various magnetic recording media have hitherto been proposed to improve the electromagnetic characteristics, the still characteristics, the durability and the corrosion resistance. For example, Japanese Patent Unexamined Publication No. 54-145505 discloses a magnetic recording medium comprising a polymer molding serving as a substrate; a deposit layer formed on a surface of the substrate, said deposit layer being formed of any one element selected from the group consisting of gold, silver and copper; a deposit layer formed thereon, said deposit layer being formed of a material having a high affinity for oxygen; and a magnetic layer further formed thereon. Japanese Patent Unexamined Publication No. 1-124115 discloses a magnetic recording medium comprising a substrate, an undercoat layer formed thereon and a magnetic layer formed on said undercoat layer by oblique deposition of a ferromagnetic metal material, in which said undercoat layer is formed of a metal or an alloy containing at least one element selected from the group consisting of aluminum, chromium, titanium and copper, and said magnetic layer is formed of the ferromagnetic metal material composed of cobalt or mainly composed thereof and comprises an aggregate of columnar magnetic particles inclined to the normal line of said substrate. Japanese Patent Unexamined Publication No. 2-68712 discloses a thin film type magnetic recording medium comprising a non-magnetic substrate, a non-magnetic undercoat layer formed thereon by paper deposition of a material having a Mohs' hardness of 5 or more, and a recording magnetic layer formed on the undercoat layer through or not through a soft magnetic layer. Japanese Patent Unexamined Publication No. 2-179917 discloses a magnetic recording medium comprising a non-magnetic substrate and a ferromagnetic metal thin film formed thereon, in which an undercoat layer formed of titanium is provided between said non-magnetic substrate and said ferromagnetic metal thin film, and the ferromagnetic metal thin film is laminated with a titanium layer and a diamond-like hard carbon coating layer. Japanese Patent Unexamined Publication No. 61-294635 discloses a magnetic recording medium comprising a polymer film substrate, a Co oxide film formed thereon by thin film deposition and a magnetic recording layer of a ferromagnetic metal further formed thereon by thin film deposition. Japanese Patent Unexamined Publication No. 1-208720 discloses a magnetic recording medium comprises a non-magnetic substrate and multiple deposit magnetic layers different in oxygen content laminated thereon. Japanese Patent Unexamined Publication No. 4-26914 discloses a magnetic recording medium comprising a non-magnetic substrate and a magnetic layer formed thereon by oblique deposition, said magnetic layer being composed of at least two ferromagnetic metal thin films, said ferromagnetic metal thin films containing Co—Ni or Co—Ni—Cr as a main component, in which the Co content of the ferromagnetic metal thin film of the uppermost layer is lower than that of the ferromagnetic metal thin film of the lowest layer.

However, in the prior-art magnetic recording media such as the magnetic recording media described in Japanese Patent Unexamined Publication Nos. 54-145505, 1-124115, 2-68712 and 2-179917, the undercoat layers are provided between the non-magnetic substrates and the ferromagnetic thin films to improve the still characteristics, the durability and the corrosion resistance, thereby attempting to enhance adhesion and strength of the magnetic films, and the use of the non-magnetic films under the ferromagnetic thin films lowers the reproduced output at a low density.

Furthermore, in the magnetic recording media described in Japanese Patent Unexamined Publication Nos. 61-294635, 1-208720 and 4-26914, attempts are made to improve the still characteristics, the durability and the reproduced output over the range of a low density to a high density by the use of the ferromagnetic thin films in multiple layers. However, the multiple layers causes the output over the range of a low density to a high density to be lowered, compared with the single thin layer.

Accordingly, a magnetic recording medium has been desired in which the reproduced output over the range of a low density to a high density are not lowered, and in which the still characteristics and the durability can be satisfied.

SUMMARY OF THE INVENTION

In order to solve the above-mentioned problems, the present inventors have conducted intensive investigations. As a result, the present inventors have discovered that the problems can be solved by a magnetic recording medium comprising a magnetic layer composed of at least two ferromagnetic thin film layers formed by oblique deposition, each of said ferromagnetic thin films having a specified saturation magnetization, coercive force and film thickness, and being specified in an average value ($\theta$) of angles between growing directions of columnar crystalline particles constituting the ferromagnetic thin film and a principal plane of a substrate, thus completing the present invention.

The present invention provides (1) a magnetic recording medium comprising a non-magnetic substrate and a magnetic layer formed thereon by oblique deposition, said magnetic layer being composed of at least two ferromagnetic thin films, in which the ferromagnetic thin film of the lowest layer-has a saturation magnetization of 300 emu/cc or less, a coercive force of 1000 Oe or less and a thickness of 300 to 1500 Å, the ferromagnetic thin layer of the uppermost layer has a saturation magnetization of 300 emu/cc or more, a coercive force of 1000 Oe or more and a thickness of 400 to 1500 Å, an average value ($\theta$) of angles between growing directions of columnar crystalline particles constituting the ferromagnetic thin film of the lowest layer and a principal plane of the substrate ranges from 50 to 70 degrees, and an average value ($\theta$) of angles between growing directions of columnar crystalline particles constituting the ferromagnetic thin film of the uppermost layer and the principal plane of the substrate ranges from 30 to 50 degrees; and (2) the magnetic recording medium described in (1), in which the ferromagnetic thin film of the lowest layer contains a single body of cobalt, nickel or iron, or an alloy thereof, and oxygen, the oxygen content thereof being 15 atomic per cent or more, and the ferromagnetic thin film of the uppermost layer contains a single body of cobalt, nickel or iron, or an alloy thereof, and oxygen, the oxygen content thereof being 15 atomic per cent or less.

DESCRIPTION OF THE PREFERRED EMBODIMENTS

In this invention, the magnetic recording medium comprises the magnetic layer composed of at least two ferromagnetic metal thin films formed by oblique deposition.

The ferromagnetic thin film of the lowest layer has a saturation magnetization of 300 emu/cc or less and a coercive force of 1000 Oe or less, and the ferromagnetic thin layer of the uppermost layer has a saturation magnetization of 300 emu/cc or more and a coercive force of 1000 Oe or more.

When the magnetization amount and the coercive force of the ferromagnetic thin film of the lowest layer are within the range described above, the electromagnetic characteristics at short wavelengths are particularly excellent and the still characteristics are satisfactory. A saturation magnetization exceeding 300 emu/cc and a coercive force exceeding 1000 Oe unfavorably results in deteriorated electromagnetic characteristics at short wavelengths and poor still characteristics. When the saturation magnetization and the coercive force of the ferromagnetic thin film of the uppermost layer are within the range described above, the electromagnetic characteristics are excellent. A saturation magnetization of less than 300 emu/cc and a coercive force of less than 1000 Oe results in deteriorated electromagnetic characteristics at all frequency bands.

Further, in the present invention, the average value ($\theta$) of the angles between the growing directions of the columnar crystalline particles constituting the ferromagnetic thin film of the lowest layer and the principal plane of the substrate ranges from 50 to 70 degrees, and the average value ($\theta$) of the angles between the growing directions of the columnar crystalline particles constituting the ferromagnetic thin film of the uppermost layer and the principal plane of the substrate ranges from 30 to 50 degrees. When the average value ($\theta$) of the angles between the growing directions of the columnar crystalline particles constituting the ferromagnetic thin film and the principal plane of the substrate is within the range described above for each of the lowest and uppermost layers, both the electromagnetic characteristics and the still durability are excellent. If the average value ($\theta$) of the angles between the growing directions of the columnar crystalline particles constituting the ferromagnetic thin film and the principal plane of the substrate is less than 50 degrees for the lowest layer, the electromagnetic characteristics at short wavelengths are deteriorated and the still durability also becomes poor. An angle exceeding 70 degrees results in inferior electromagnetic characteristics at short wavelengths. Further, for the uppermost layer, an angle of less than 30 degrees results in inferior still durability and lowered film-forming efficiency, and an angle exceeding 50 degrees results in deteriorated electromagnetic characteristics.

In the present invention, the ferromagnetic thin films of the lowest layer and the uppermost layer have thicknesses of 400 to 1500 Å and 300 to 1500 Å, respectively.

As the non-magnetic substrates, various usual films are used, as long as they resist heat on vapor deposition of the ferromagnetic metal thin films. Examples of such films include films of polyesters, polyamides, aramides, polysulfones and polyether ether ketone (PEEK). Films of polyethylene terephthalate (PET) and polyethylene naphthalate (PEN) are available.

The magnetic layer composed of the plural ferromagnetic metal thin films in the present invention is formed, for example, by transferring the non-magnetic substrate film in contact with the periphery of a rotating cylindrical cooling roll, depositing a ferromagnetic metal over the substrate film under an atmosphere of oxygen by oblique deposition to form a ferromagnetic thin film, winding the substrate film on a roll, and depositing a ferromagnetic metal over the ferromagnetic thin film thus formed on the substrate film under an atmosphere of oxygen by oblique deposition again. The saturation magnetization, the coercive force, the average value ($\theta$) of the angles between the growing directions of the columnar crystalline particles constituting the ferromagnetic thin film and the principal plane of the substrate, the film thickness and the amount of oxygen are adjusted to desired values for each of the ferromagnetic thin films of the lowest and uppermost layer.

The magnetization amount and the coercive force can be adjusted by the composition of the raw material for deposition and the flow rate of introduced oxygen. Further, the average value ($\theta$) of the angles between the growing directions of the columnar crystalline particles constituting the ferromagnetic thin film and the principal plane of the substrate can be adjusted by restricting an incident direction of evaporated particles in film forming with a shielding plate, etc.

In the present invention, the ferromagnetic thin film may be composed of a single body of cobalt, nickel or iron, or an alloy thereof, and may further contain another element such as chromium, boron, carbon or nitrogen.

It is desirable that the ferromagnetic metal thin film of the uppermost layer be formed of Co or an alloy containing Co as a main component. The alloys containing Co as the main component include Co—Ni, Co—Fe, Co—Cr, Co—Ni—Cr, Co—Pt—Cr, Co—Cu, Co—Sm and Co—P. Of these, Co—Ni is preferred, and particularly, an alloy containing about 80% or more than 80% of Co and about 20% or less than 20% of Ni in molar ratio is preferred.

It is desirable that the ferromagnetic metal thin film of the lowest layer be formed of Co or an alloy containing Co as a main component, or Ni or an alloy containing Ni as a main component. The alloys containing Co as the main component include Co—Ni, Co—Fe, Co—Cr, Co—Ni—Cr, Co—Cu and Co—P. The alloys containing Ni as the main component include Ni—Co and Ni—Fe.

The oxygen content of the ferromagnetic metal thin film of the uppermost layer is preferably 15 atomic per cent or less, and the oxygen content of the ferromagnetic metal thin film of the lowest layer is preferably 15 atomic per cent or more.

In the magnetic recording medium of the present invention, the magnetic layer composed of at least two ferromagnetic thin films is formed on the non-magnetic substrate by oblique deposition, the ferromagnetic thin film of the lowest layer of the magnetic layer has a saturation magnetization of 300 emu/cc or less and a coercive force of 1000 Oe or less, the ferromagnetic thin layer of the uppermost layer has a saturation magnetization of 300 emu/cc or more and a coercive force of 1000 Oe or more, the average value ($\theta$) of the angles between the growing directions of the columnar crystalline particles constituting the ferromagnetic thin film of the lowest layer and the principal plane of the substrate ranges from 50 to 70 degrees, and that of the uppermost layer ranges from 30 to 50 degrees, whereby the magnetic recording medium satisfying the still characteristics and the durability as well as the high electromagnetic characteristics can be obtained.

The present invention is described below with reference to the following examples.

The characteristics of the magnetic recording tapes were measured as follows:

(1) Rust Generation

After storage under the circumstances of 60° C. and 90% RH for 1 week, the degree of a color change on the magnetic layer side of each tape was visually determined. A criterion for evaluation was as follows:

⊚: No change

○: Change to light yellow

Δ: Change to yellow x: Change to blue (2) Cupping

After storage under the circumstances of 60° C. and 90% RH for 1 week, each tape was placed on a flat surface, and the height (h) of warping of edge portions in the width direction of the tape was measured. A criterion for evaluation was as follows:

⊚: h=0

○: 0<h≦0.2 mm

Δ: 0.2 mm<h<0.5 mm x: h≧0.5 mm (3) Electromagnetic Characteristics

Using a Hi8-standard VTR (SONY EV-S900), the RF output of each tape on which a single signal of 0.75 MHz was recorded was compared with that of each tape on which a single signal of 7 MHz was recorded to judge the results based on the following criterion for evaluation:

⊚: RF output≧2.0 dB

○: 0 dB≦RF output≦2.0 dB

Δ: −1.0 dB≦RF output<0 dB x: RF output<−1.0 dB (4) Still Durability

Using a Hi8-standard VTR (SONY EV-S900), the time required until its output was reduced to 6 dB at 0° C. was measured.

⊚: Still≧60 minutes

○: 30 minutes≦Still≦60 minutes

Δ: 10 minutes≦Still<30 minutes x: Still<10 minutes (5) Method for Measuring θ

The average value (θ) of the angles between the growing directions of the columnar crystalline particles and the principal plane of the substrate is measured in the following manner:

First, a magnetic recording medium is cut at a plane including the growing directions of the columnar crystalline particles (usually, a plane perpendicular to the principal plane of the medium and including a running direction of a magnetic head). On this cross section, cross sections of the columnar crystalline particles constituting each ferromagnetic metal thin film appear in arc form. Angles between side faces of the columnar crystalline particles appearing on this cross section (boundary lines between adjacent columnar crystalline particles) and the principal plane of the substrate are measured for at least 100 columnar crystalline particles for every ferromagnetic metal thin film to determine an average value thereof for every ferromagnetic metal thin film. Taking these respective average values as the angles between the growing directions of the columnar crystalline particles and the principal plane of the substrate, the average value thereof is further determined as θ. θ is measured at an intermediate point in the thickness direction of the ferromagnetic metal thin film.

EXAMPLES 1 to 10 AND COMPARATIVE EXAMPLES 1 to 4

A 6 μm-thick polyethylene terephthalate (PET) film was drawn out of a feed roll in an atmosphere of argon at $10^{-4}$ Torr, and transferred in contact with the periphery of a rotating cylindrical cooling roll. Then, a ferromagnetic metal was deposited over the film under an atmosphere of oxygen by oblique deposition to form a ferromagnetic thin film, and the film was wound on a take-up roll. Subsequently, the film was rewound from the take-up roll to another roll, from which the film was fed. A ferromagnetic metal was deposited over the film again under an atmosphere of oxygen by oblique deposition to form a ferromagnetic thin film, thereby obtaining a magnetic recording medium having a magnetic layer of two-layer structure.

The kinds of the ferromagnetic metals used for formation of the uppermost and lowest layers, and the saturation magnetization, the coercive force, the amount of oxygen, the film thickness and θ of the ferromagnetic thin films were changed to obtain samples shown in Table 1.

TABLE 1

| | Upper Layer | | | Intermediate Layer | | | Lower Layer | | |
|---|---|---|---|---|---|---|---|---|---|
| | Composition Co/Ni | Oxygen Amount (at %) | Film Thickness (Å) | Composition Co/Ni | Oxygen Amount (at %) | Film Thickness (Å) | Composition Co/Ni | Oxygen Amount (at %) | Film Thickness (Å) |
| Example | | | | | | | | | |
| 1 | 9/1 | 12 | 1000 | | | | 8/2 | 18 | 1000 |
| 2 | 9/1 | 15 | 1000 | | | | 8/2 | 18 | 1000 |
| 3 | 9/1 | 12 | 1000 | | | | 8/2 | 16 | 1000 |
| 4 | 9/1 | 12 | 1000 | | | | 8/2 | 20 | 1000 |
| 5 | 9/1 | 12 | 1000 | | | | 8/2 | 30 | 1000 |
| 6 | 9/1 | 12 | 600 | | | | 8/2 | 18 | 1400 |
| 7 | 9/1 | 12 | 1400 | | | | 8/2 | 18 | 600 |
| 8 | 9/1 | 12 | 1000 | | | | 0/10 | 18 | 1000 |
| 9 | 9/1 | 12 | 700 | 9/1 | 12 | 700 | 8/2 | 18 | 700 |
| 10 | 9/1 | 12 | 700 | 9/1 | 12 | 700 | 0/10 | 18 | 700 |
| 11 | 8/2 | 15 | 1000 | | | | 8/2 | 15 | 1000 |

TABLE 1-continued

| | | | | | | | | | | |
|---|---|---|---|---|---|---|---|---|---|---|
| 12 | 9/1 | 12 | 1500 | | | | 8/2 | 18 | 300 |
| 13 | 9/1 | 12 | 400 | | | | 8/2 | 18 | 1500 |
| 14 | 9/1 | 12 | 1000 | | | | 8/2 | 18 | 1000 |
| 15 | 9/1 | 12 | 1000 | | | | 8/2 | 18 | 1000 |
| 16 | 9/1 | 12 | 1000 | | | | 8/2 | 18 | 1000 |
| 17 | 9/1 | 12 | 1000 | | | | 8/2 | 18 | 1000 |
| 18 | 9/1 | 12 | 1000 | | | | 8/2 | 15 | 1000 |
| 19 | 10/0 | 12 | 1000 | | | | 0/10 | 18 | 1000 |
| 20 | 10/0 | 15 | 1000 | | | | 0/10 | 18 | 1000 |
| 21 | 8/2 | 12 | 1000 | | | | 0/10 | 18 | 1000 |
| 22 | 10/0 | 15 | 800 | 10/0 | 15 | 800 | 8/2 | 18 | 400 |
| 23 | 8/2 | 12 | 800 | 8/2 | 12 | 800 | 8/2 | 18 | 400 |
| 24 | 10/0 | 15 | 800 | 10/0 | 15 | 800 | 0/10 | 15 | 400 |
| 25 | 8/2 | 12 | 800 | 8/2 | 12 | 800 | 0/10 | 15 | 400 |
| 26 | 9/1 | 12 | 1000 | | | | 8/2 | 18 | 1000 |
| 27 | 9/1 | 12 | 800 | 9/1 | 12 | 800 | 8/2 | 18 | 400 |
| Comparative Example | | | | | | | | | |
| 1 | 9/1 | 20 | 1000 | | | | 8/2 | 18 | 1000 |
| 2 | 9/1 | 12 | 1000 | | | | 8/2 | 12 | 1000 |
| 3 | 9/1 | 20 | 700 | 9/1 | 20 | 700 | 8/2 | 18 | 700 |
| 4 | 9/1 | 12 | 700 | 9/1 | 12 | 700 | 8/2 | 12 | 700 |
| 5 | 9/1 | 12 | 300 | | | | 8/2 | 18 | 1600 |
| 6 | 9/1 | 12 | 1600 | | | | 8/2 | 18 | 200 |
| 7 | 9/1 | 12 | 1000 | | | | 8/2 | 18 | 1000 |
| 8 | 9/1 | 12 | 1000 | | | | 8/2 | 18 | 1000 |
| 9 | 9/1 | 12 | 1000 | | | | 8/2 | 18 | 1000 |
| 10 | 9/1 | 12 | 1000 | | | | 8/2 | 18 | 1000 |
| 11 | 9/1 | 12 | 1000 | | | | 9/1 | 12 | 1000 |
| 12 | 9/1 | 12 | 800 | 9/1 | 12 | 800 | 9/1 | 12 | 400 |

| | Upper Layer | | | Intermediate Layer | | | Lower Layer | | | Electromagnetic Characteristics | | Rust | | |
|---|---|---|---|---|---|---|---|---|---|---|---|---|---|---|
| | Hc (Oe) | Ms (emu/cc) | θ (deg) | Hc (Oe) | Ms (emu/cc) | θ (deg) | Hc (Oe) | Ms (emu/cc) | θ (deg) | 0.75 MHz | 7 MHz | Generation | Cupping | Still |
| Example | | | | | | | | | | | | | | |
| 1 | 1400 | 440 | 40 | | | | 800 | 200 | 60 | ⊙ | ⊙ | ⊙ | ⊙ | ⊙ |
| 2 | 1400 | 320 | 40 | | | | 800 | 200 | 60 | ⊙ | ○ | ⊙ | ⊙ | ⊙ |
| 3 | 1400 | 440 | 40 | | | | 900 | 230 | 60 | ⊙ | ○ | ○ | ○ | ○ |
| 4 | 1400 | 440 | 40 | | | | 700 | 180 | 60 | ⊙ | ⊙ | ⊙ | ⊙ | ⊙ |
| 5 | 1400 | 440 | 40 | | | | 500 | 150 | 60 | ⊙ | ⊙ | ⊙ | ⊙ | ⊙ |
| 6 | 1400 | 440 | 40 | | | | 800 | 200 | 60 | ⊙ | ○ | ⊙ | ⊙ | ⊙ |
| 7 | 1400 | 440 | 40 | | | | 800 | 200 | 60 | ○ | ⊙ | ⊙ | ⊙ | ○ |
| 8 | 1400 | 440 | 40 | | | | 100 | 80 | 60 | ⊙ | ⊙ | ⊙ | ⊙ | ⊙ |
| 9 | 1500 | 440 | 40 | 1500 | 440 | 40 | 800 | 200 | 60 | ⊙ | ⊙ | ⊙ | ⊙ | ⊙ |
| 10 | 1500 | 440 | 40 | 1500 | 440 | 40 | 100 | 70 | 60 | ⊙ | ⊙ | ⊙ | ⊙ | ⊙ |
| 11 | 1000 | 300 | 50 | | | | 1000 | 300 | 50 | ○ | ○ | ⊙ | ⊙ | ⊙ |
| 12 | 1400 | 440 | 40 | | | | 500 | 160 | 60 | ○ | ⊙ | ○ | ○ | ○ |
| 13 | 1300 | 400 | 40 | | | | 800 | 200 | 60 | ⊙ | ○ | ○ | ⊙ | ○ |
| 14 | 1400 | 440 | 40 | | | | 1000 | 190 | 50 | ⊙ | ⊙ | ○ | ○ | ○ |
| 15 | 1400 | 440 | 40 | | | | 500 | 260 | 70 | ○ | ⊙ | ⊙ | ⊙ | ⊙ |
| 16 | 1500 | 380 | 30 | | | | 800 | 200 | 60 | ⊙ | ⊙ | ○ | ⊙ | ○ |
| 17 | 1300 | 460 | 50 | | | | 800 | 200 | 60 | ⊙ | ○ | ⊙ | ○ | ⊙ |
| 18 | 1400 | 440 | 40 | | | | 950 | 300 | 60 | ⊙ | ⊙ | ○ | ○ | ○ |
| 19 | 1500 | 450 | 40 | | | | 100 | 80 | 60 | ○ | ⊙ | ○ | ○ | ○ |
| 20 | 1550 | 420 | 40 | | | | 100 | 80 | 60 | ○ | ⊙ | ○ | ○ | ○ |
| 21 | 1100 | 380 | 40 | | | | 100 | 80 | 60 | ○ | ○ | ⊙ | ○ | ⊙ |
| 22 | 1600 | 390 | 40 | 1600 | 390 | 40 | 800 | 200 | 60 | ⊙ | ⊙ | ○ | ○ | ○ |
| 23 | 1100 | 370 | 40 | 1100 | 370 | 40 | 800 | 200 | 60 | ○ | ○ | ⊙ | ○ | ○ |
| 24 | 1600 | 390 | 40 | 1600 | 390 | 40 | 200 | 150 | 60 | ⊙ | ⊙ | ○ | ○ | ○ |
| 25 | 1100 | 370 | 40 | 1100 | 370 | 40 | 200 | 150 | 60 | ⊙ | ⊙ | ⊙ | ○ | ⊙ |
| 26 | 1400 | 440 | 40 | | | | 600 | 250 | 60 | ⊙ | ⊙ | ○ | ○ | ○ |
| 27 | 1500 | 440 | 40 | 1200 | 450 | 40 | 500 | 180 | 60 | ⊙ | ⊙ | ○ | ○ | ○ |
| Comparative Example | | | | | | | | | | | | | | |
| 1 | 1450 | 280 | 40 | | | | 800 | 200 | 60 | x | △ | ⊙ | ⊙ | ⊙ |
| 2 | 1400 | 440 | 40 | | | | 1000 | 380 | 60 | ⊙ | △ | △ | △ | x |
| 3 | 1400 | 290 | 40 | 1400 | 290 | 40 | 800 | 200 | 60 | x | △ | ⊙ | ⊙ | ⊙ |
| 4 | 1500 | 440 | 40 | 1500 | 440 | 40 | 900 | 370 | 60 | ⊙ | x | △ | △ | x |
| 5 | 800 | 350 | 40 | | | | 750 | 200 | 60 | x | x | △ | △ | x |
| 6 | 1400 | 440 | 40 | | | | 500 | 100 | 60 | ⊙ | △ | ○ | ○ | x |
| 7 | 1400 | 440 | 40 | | | | 1000 | 180 | 40 | ○ | ⊙ | △ | ○ | △ |

TABLE 1-continued

| | | | | | | | | | | | | | | |
|---|---|---|---|---|---|---|---|---|---|---|---|---|---|---|
| 8  | 1400 | 440 | 40 |      |     |    | 300  | 300 | 80 | Δ | o | ⊙ | ⊙ | ⊙ |
| 9  | 900  | 200 | 20 |      |     |    | 1200 | 450 | 60 | x | x | Δ | Δ | x |
| 10 | 900  | 480 | 60 |      |     |    | 1200 | 450 | 60 | ⊙ | x | o | o | Δ |
| 11 | 1400 | 440 | 40 |      |     |    | 1200 | 450 | 60 | ⊙ | ⊙ | Δ | Δ | x |
| 12 | 1500 | 440 | 40 | 1200 | 450 | 40 | 1100 | 400 | 60 | ⊙ | ⊙ | Δ | Δ | Δ |

The magnetic recording medium of the present invention has excellent electromagnetic characteristics over the range of a low density to a high density, and particularly the reduction in reproduced output at a high density is minimized. In addition, both the still characteristics and the durability are extremely excellent. The magnetic recording medium of the present invention is therefore a very suitable medium for high density recording.

What is claimed is:

1. A magnetic recording medium comprising a nonmagnetic substrate and a magnetic layer formed thereon by oblique deposition, said magnetic layer being composed of at least two ferromagnetic metal thin film layers, a lowest film layer disposed closest to the substrate and an uppermost film layer disposed farthest from the substrate, in which each of the thin film layers contains cobalt, nickel or iron, or an alloy thereof, and oxygen, the ferromagnetic thin film of the lowest film layer has a saturation magnetization of 300 emu/cc or less, a coercive force of 1000 Oe or less, a thickness of 300 to 1500 Å and an oxygen content 15 atomic per cent or more, the ferromagnetic thin layer of the uppermost film layer has a saturation magnetization of 300 emu/cc or more, a coercive force of 1000 Oe or more, a thickness of 400 to 1500 Å and an oxygen content of 15 atomic per cent or less, an average value ($\theta$) of angles between growing directions of columnar crystalline particles constituting the ferromagnetic thin film of the lowest film layer and a principal plane of the substrate ranges from 50 to 70 degrees, and an average value ($\theta$) of angles between growing directions of columnar crystalline particles constituting the ferromagnetic thin film of the uppermost film layer and the principal plane of the substrate ranges from 30 to 50 degrees.

* * * * *